US007898385B2

(12) United States Patent
Kocher

(10) Patent No.: US 7,898,385 B2
(45) Date of Patent: Mar. 1, 2011

(54) PERSONNEL AND VEHICLE IDENTIFICATION SYSTEM USING THREE FACTORS OF AUTHENTICATION

(76) Inventor: Robert William Kocher, Arlington, VA (US)

( * ) Notice: Subject to any disclaimer, the term of this patent is extended or adjusted under 35 U.S.C. 154(b) by 0 days.

(21) Appl. No.: 10/179,971

(22) Filed: Jun. 26, 2002

(65) Prior Publication Data

US 2004/0002894 A1 Jan. 1, 2004

(51) Int. Cl.
*H04Q 1/00* (2006.01)

(52) U.S. Cl. ...................... 340/5.52; 340/5.53; 340/5.54; 340/5.61

(58) Field of Classification Search ................ 340/5.52, 340/5.82, 5.84, 5.81, 471, 989, 5.53, 5.54, 340/5.85, 5.71, 5.61-5.64, 928, 5.5, 5.51, 340/5.83, 10.1, 572.1; 235/384; 701/29; 382/115, 117, 118, 124; 705/13
See application file for complete search history.

(56) References Cited

U.S. PATENT DOCUMENTS 4,665,395 A * 5/1987 Van Ness ..................... 340/5.25
4,970,389 A * 11/1990 Danforth et al. .............. 250/271
4,993,068 A * 2/1991 Piosenka et al. .............. 713/186
5,751,973 A * 5/1998 Hassett ........................... 705/13
5,867,802 A * 2/1999 Borza .......................... 340/5.53
5,933,515 A * 8/1999 Pu et al. ........................ 382/124
6,140,939 A * 10/2000 Flick ........................ 340/825.69
6,160,903 A * 12/2000 Hamid et al. ................. 382/115
6,271,745 B1 * 8/2001 Anzai et al. .................. 340/5.53
6,373,148 B1 * 4/2002 Daiss et al. .................. 307/10.5
6,421,453 B1 * 7/2002 Kanevsky et al. ............ 382/115
6,498,970 B2 * 12/2002 Colmenarez et al. ........... 701/36
6,624,739 B1 * 9/2003 Stobbe ........................... 340/5.2
6,703,918 B1 * 3/2004 Kita ............................. 340/5.52
6,867,683 B2 * 3/2005 Calvesio et al. ............. 340/5.52
6,958,676 B1 * 10/2005 Morgan et al. ............... 340/5.72
2001/0054154 A1 * 12/2001 Tam ............................. 713/186
2002/0090146 A1 * 7/2002 Heger et al. ................... 382/291
2002/0126881 A1 * 9/2002 Langley ........................ 382/124
2002/0181747 A1 * 12/2002 Topping ........................ 382/124
2003/0105964 A1 * 6/2003 Brainard et al. .............. 713/178

* cited by examiner

*Primary Examiner* — Edwin C Holloway, III
(74) *Attorney, Agent, or Firm* — Andrew K. Wichmann

(57) ABSTRACT

The Personnel And Vehicle Identification System Using Three Factors of Authentication (PAVIS-3) invention is a novel approach that combines the three authentication factors using contactless token, contactless biometric, and the unique position of said biometric presented by a person to allow rapid authentication and access to a base or building. This invention has the real potential to reduce manpower at base gates, building, and greatly improve system security. A vehicle with a contactless token such as an RFID, proximity chip, or barcode, approaches an entry lane at a base, the contactless token is read, verified, (first factor) queuing the individual's file with a biometric template and personal identification position. The biometric image is taken, reduced to a template, compared with the template in the database and if matched (second factor) the body position is examined to see if it matches the personal identification position (third factor) as a normal or covert distressed signal. If normal the vehicle is given a green light, if any match fails the vehicle is directed to the visitor's lane.

15 Claims, 4 Drawing Sheets

PERSONNEL AND VEHICLE IDENTIFICATION SYSTEM USING THREE FACTORS OF AUTHENTICATION

FEDERALLY SPONSORED RESEARCH

Not Applicable

REFERENCE TO A MICROFICHE APPENDIX

Not Applicable

BACKGROUND-FIELD OF INVENTION

This invention relates to the positive identification of an individual based on three factors of authentication: (1) a biometric signature derived from a body part, (2) a unique position of the body part known only to the individual, and (3) a physical identification token that also states the individual's identity and/or vehicle identity. This system can be used with a vehicle entry system, incorporating contactless tags and sensors specifically used to identify vehicles. Through the utilization of hand, ear, or body part recognition software, and examining the position of operator's body part, and using contactless tags to queue a database, said systems will verify a match (or no-match) between the vehicle and operator.

BACKGROUND-DESCRIPTION OF PRIOR ART

Every day millions of people drive onto installations controlled parking lots, military bases, and other restricted areas. A guard posted at the front gate checking personnel and vehicles is the most common method for controlling access to these areas. Access is granted based on facility protocol instructions and rules for vehicles and operators desiring access. Common protocols require the vehicle to be registered and have either a bumper or windshield sticker and the driver to have some special access identification card.

Individual access is typically granted based on various types of authentication. These types of authentication may be used alone or in conjunction with others: (1) is typically "something you have", e.g. an ID card, a key, a Radio Frequency Identification Device (RFID), papers, letters, or pass tokens; (2) is "something you know", such as a combination, Personal Identification Number (PIN), password or other special information; and (3) is a biometrics or "body part", such as fingerprints, hand geometry, face, ears geometry, thermal signatures or photographs. Unfortunately, each type of identification authentication system has its own set of inherent weaknesses.

The weakness with a "something you have" system is that if your token is lost, stolen, or forged, the system will allow the holder access. This is typically the problem with ID cards, driver licenses, badges, etc. The system is made stronger if checks are performed to see if the token is still valid. Unfortunately, the typical use for single factor ID cards is a magnet stripe or RFID that does not challenge the holder.

The weakness with the "something you know" system is that since PINs are easily forgotten, they are written down or selected from a list of easy-to-break PINs such as your phone number, wife's name, birthday, or other clever but unsecure choices. Most people write down PINs and keep them in a wallet or within 6 feet of the computer. Government studies indicate that 40% of PINs can be found within 6 feet of the operator or computer. Other people can observe the operator type in his or her PIN and most people tend to share their PIN with others. Consequently, the single factor 'something you know' system is easily defeated once a PIN is known.

The weakness with the "something you are" or biometrics system is that fingerprints can be copied, face recognition systems can fail against a photograph, and most other traditional biometrics systems can be defeated through various methods. One undesirable method is using a person's cut off finger or body part to allow access. This fear prompted the biometrics community to develop an upgrade for the system to test for liveness. Biometric system matches are also based on the probability of a match; therefore, there is always a small percentage of possible false accepts, i.e. granting the wrong person access. In addition, biometrics also has legal and privacy issues such as people willing to give up their fingerprints and legal issues surrounding what can be done with the fingerprints on file. Also, once someone's fingerprints are compromised, they are compromised for life.

Single factor identification authentication systems are easily defeated in today's high tech world due to the high level of computer availability and the basic computer literacy of the world population. Unfortunately, some use these opportunities for the acquisition of others' identity codes, the publication of false ID cards licenses, et cetera, and the acquisition of others' biometrics. Even traditional two-factor identification authentication such as an ID card with a photograph is easily counterfeited. Statistics exist which state that guards that look at ID cards all day have less than a 20% chance of detecting forged document and less than a 50% chance of detecting someone using another's card.

The vast majority of people and vehicles entering a facility each day are authorized. The overall objective is to identify authorized vehicles and people by utilizing a minimal time delay to permit their access while preventing others' unauthorized access. Three of the key problems with the current protocol methods are (1) extensive manpower resource costs, (2) execution delays during high traffic periods, and (3) an inherently flawed system, all of which allow the system to be defeated with relative difficulty.

The current protocol of placing guards at a gate is manpower intensive. To handle volume surges, multiple guards must be present along with a supervisor. Multiple shifts are required. Industry estimates show that the requirement of having one person present 24 hrs a day requires 5 people for that position. This is typically 3 people a day for 8 hour shifts each, for 5 days and the additional 2 people are for rotating during the weekend and account for sick, leave, and holidays that the 40 hr a week employee requires. Gates typically require two guards at all times to compensate for bathroom breaks and to deal with incidents. Post Sep. 11, 2001 facilities have posted additional guard personnel at currently manned and previously unmanned gates and increased individual vehicle inspections to try to ensure that the vehicle and its operator have authorized access to the facility. Organizations are facilitating these changes with the hope that such change will provide sufficient protection. This influx of additional gate manpower drains resources away from an organization's primary mission.

The second inherent problem with the current identification verification protocol is in its execution. Common protocols require the vehicle to stop, the operator to roll down the window, hand the ID card to the guard, and the guard to examine the ID card and vehicle sticker to determine if access should be granted. The vehicle then drives away and the next one enters the process. This process may take anywhere from 10 to 20 seconds per vehicle, resulting in long vehicle lines during times of heavy traffic.

The third inherent problem with the current identification verification protocol is its accuracy. Vehicle stickers pose several problems because they are easily copied, easily stolen, and reveal your affiliation beyond the necessary sites. Identification cards also pose several problems because they are also easily copied, altered, or stolen, and tests show that a guard's accurate verification of identification is very poor—less than 50% of guards are able to detect an altered ID card or someone using another's card. A guard's work involves repetitive tasks and tedious work to the point that the guard is easily defeated using the current system.

Typically, machines are better at performing repetitive tasks when compared to humans. Mechanical approaches to a token-based identification system provide better accuracy when compared to human guards. Examples are pass cards that must be placed in a machine reader. The reader reads the card, verifies authorization, and then opens the gate. The weakness in the mechanical approach is that anyone with the card is granted access.

Another evolving approach is the use of biometrics: the measurement of a body part such as fingerprint, face, hand geometry or iris. This approach provides a better chance for identification but has related problems when used in restricted area access when people are in vehicles. Several problems include: (1) requiring the vehicle operator to reach out from the vehicle and touch a fingerprint reader or hand geometry system which causes delay and personal security concerns; (2) requiring multiple people to touch the same reader which causes sanitation concerns; (3) operation in extreme weather conditions which may lead to false readings or other malfunctions; and (4) the possibility of privacy and data protection issues due to the inherent problems noted in points one and three. Another significant issue with biometrics is spoofing. There are many ways to defeat biometrics systems from using a photograph to defeat facial recognition to the possibility of encouraging the cutting off of a victim's fingers to gain access. Liveness is an issue that is currently in development for implementation in common biometrics systems.

Completely unmanned gates may be possible for low volume gates in which no visitors are allowed access. Main gates will require human guards to deal with visitors, deliveries, or situations where the vehicle or operator has official business but no authorized credentials. An optimal system would allow technology or a machine to automatically verify authorized people while potentially unauthorized traffic (deliveries, et cetera) would be the focus of the guards, which would allow more time for vehicle searches and less wait time for authorized personnel.

Moving vehicle access systems exist today, such as highway toll systems that use a RFID transmitter in the car to allow access, but this system is one factor—it does not identify the individual—thus providing little security.

SUMMARY

The Personnel And Vehicle Identification System Using Three Factors of Authentication (PAVIS-3) invention combines the three authentication factors: contactless token, contactless biometric, and the unique position of said biometric presented by a person to allow rapid authentication and access to a base, building, or other secured area.

OBJECTS AND ADVANTAGES

The Personnel And Vehicle Identification System Using Three Factors of Authentication (PAVIS-3) invention is a breakthrough in the identification and authorization of vehicles and individuals entering bases or other secure facilities by being a system founded upon accuracy, low system cost, and speed.

Accuracy: the combining of the “something you have”, “something you know” and “something you are” systems is considered the strongest combination of authentication. The PAVIS-3 combines a queuing token for calling the individual's file to compare the individual's special biometrics and compares the biometrics signature in a special position. This combination allows for three-factor identification resulting in positive personnel identification and a determination for granting access. For an individual to defeat the system, he or she would have to acquire or copy the token, the biometric, and the biometrics' special position on or in the vehicle. Using a one-to-one match rather than a one-to-many also increases accuracy. When the PAVIS-3 token queues the individual's file, the biometrics match and biometrics position must match the file's data. This one-to-one match is also considered to be the strongest form for matching biometrics and PINs.

Speed: the PAVIS-3 token links the file pointer to the sensor, and, in milliseconds, the file is retrieved and read. At the same time the token sensor receives its signal, the biometrics sensor captures the biometrics image, converts it to a template and compares the said template to the one on file. If the templates match, the biometric image is then compared to the filed biometrics image position to determine if there is a match. The entire PAVIS-3 process can occur in less than one second. Since the image and token signal are captured in a fraction of a second, PAVIS-3 sensors could be located to allow for positive identification of vehicles and operators while moving down an access lane, thus not requiring the vehicle to stop.

Costs: a key advantage of the PAVIS-3 system is cost per vehicle. Short-range Radio Frequency Identification Device (RFID) sensors can cost less than 50 cents each. Barcodes are less and are the only hardware component required for each vehicle. The individual's body part and the position of the body part on or in the vehicle do not require any vehicle components or modifications.

Other optional additions to the PAVIS-3 system include adding biometrics positions to allow for a covert distress call. This means that if an individual were a hostage by someone that wants access, the authorized individual would present his biometrics in a pre-registered distress pattern that would alert security personnel to follow the vehicle as it is granted access. An advantage to this system is that since PAVIS-3 has the capability for three factors of authentication, fewer factors could be applied during times of low threat levels. For example, if no threats were anticipated, the simple token (RFID or Bar Code) device would be sufficient for access to the site. This would not require the individual to present his biometric and biometrics signature. The vehicle or individual's ID token could be read and access granted while the vehicle is on the move.

DRAWINGS

LIST OF REFERENCE NUMERALS

Item 1=system activation switch
Item 2=token sensor reader signal
Item 3=signal to activate yellow light
Item 4=token validation
Item 5=retrieve operator file in computer unit
Item 6=biometric sensor activation and image capture
Item 7=convert biometric image to template
Item 8=determination of biometric template match
Item 9=read biometrics template from file
Item 10=calculate pattern orientation
Item 11=determine pattern match
Item 12=read orientation pattern from database
Item 13=activate red light or visitor lane arrow
Item 14=determination if pattern match is normal
Item 15=is the pattern a distressed pattern
Item 16=alert security forces
Item 17=activate green light or automatic entry lane arrow
Item 18=ground vehicle senor
Item 19=contactless token sensor
Item 20=signal light
Item 21=system central computer unit
Item 22=wires connecting sensors to central computer
Item 23=biometrics sensor
Item 24=visitor inspection station
Item 25=vehicle barrier
Item 26=registration process, registration station
Item 27=individual identification
Item 28=verification of authorization
Item 29=contactless token issued
Item 30=biometric enrollment
Item 31=normal situation unique position or sign
Item 32=distressed situation unique position or sign
Item 33=verification test that enrollment is proper
Item 34=individual is enrolled
Item 35=hand in normal position
Item 36=hand in unique position
Item 37=finger concealed as special sign
Item 38=unique sign or position
Item 39=vehicle
Item 40=contactless token
Item 41=a vehicle operator that presents a biometric signature

DETAILED DESCRIPTION

Preferred Embodiment

Figure 1:
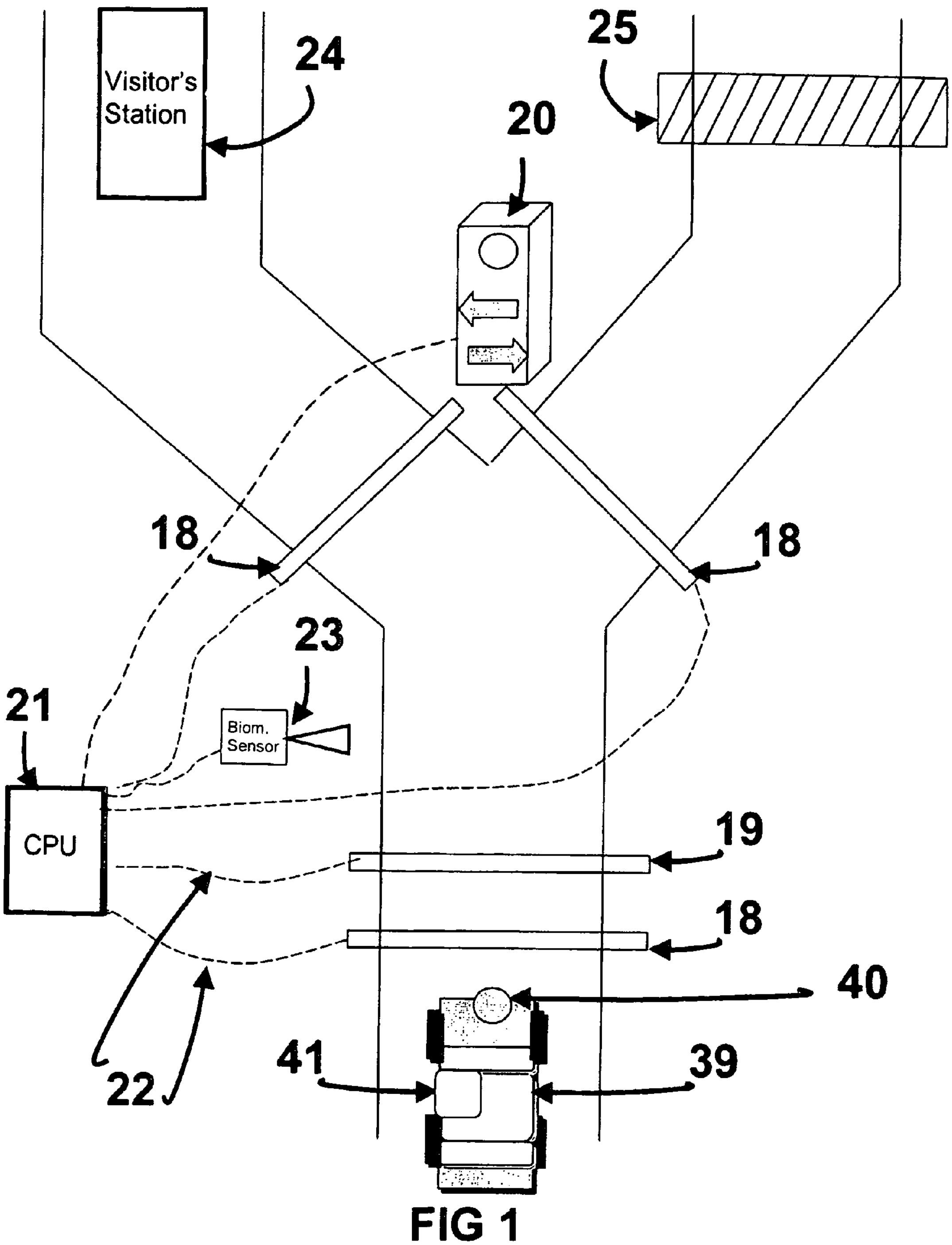
FIG. 1 is a diagram of an entrance roadway with a Personnel And Vehicle Identification System Using Three Factors of Authentication (PAVIS-3) base access system.

FIG. 1 shows the Personnel And Vehicle Identification System Using Three Factors of Authentication (PAVIS-3) invention components. The vehicle enters the gate area and the vehicle contains a contactless token such as a Radio Frequency Identification Device (RFID), bar code or proximity tag, and a vehicle operator who has been enrolled in the system and associated with the vehicle and token sensor. The vehicle drives up to the activation sensor 18 activating the system and alerts the token sensor 19 to sense for a token. The token sensor 19 senses the token 40 and reads the unique number contactlessly transmitted to the sensor 19. The token number is transmitted by a communications device or cable 22 to the central computer unit 21 to determine if it is valid, and if so, to pull up the related file. If the token 40 is valid, the valid token light is illuminated on the traffic signal 20 to inform the operator 41 of the match and to direct the operator to present his biometrics to the biometric sensor 23. The token match constitutes the first factor of authentication. The biometric sensor 23 takes the image of the biometric presented (hand, face, iris, etc.) converts it to a template in the computer 21, and performs a one-to-one match with the record retrieved by the token identification number. If this match occurs, the second factor of authentication is made. Once the biometric match is made the sensor looks for the special position of the biometric or body part to match the pattern stored in the database. This pattern match constitutes the third factor of authentication. With three factors of authentication in place, the signal light 20 indicates a green light or arrow for the vehicle to proceed through the automatic pass lane. A ground sensor 18 senses if the vehicle went in the right direction and allows the system to process the next vehicle. An additional recommended security measure would be the placement of a remote activated ground level vehicle barrier 25 down the road to stop or block a vehicle that made the wrong turn down the automatic entry lane instead of proceeding left to the visitor inspection lane. The ground sensor 18 located on the visitor lane confirms vehicles and operators, which fail a factor of authentication, and emits a red arrow on the signal light 20 to direct said vehicles and operators to the visitor's inspection station 24.

Figure 2:
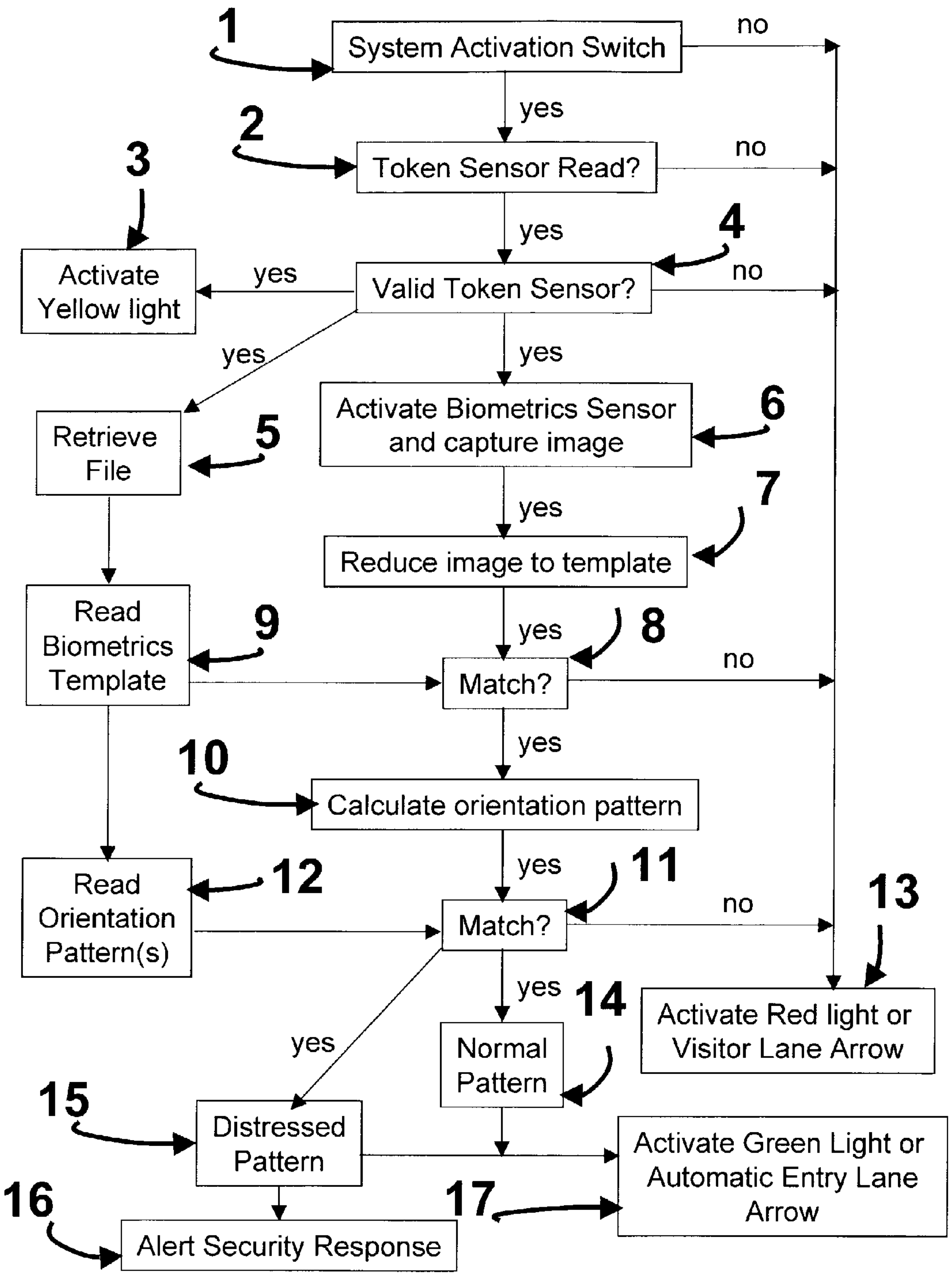
FIG. 2 shows the logic flow of the PAVIS-3.

FIG. 2. shows the process followed by the Personnel And Vehicle Identification System Using Three Factors of Authentication (PAVIS-3) invention. In the vehicle embodiment, the process is initiated by a vehicle passing over or through an activation switch 1 which can be a pressure switch, light beam, or other type of object sensor. The activation switch queues the token sensor reader 2 to seek a contactless sensor signal such as a RFID or reflected transmission. The RFID token can be located on the bottom of the vehicle and the token sensor located in the street. Once the token sensor reads the token signal, the token is then compared to a database to determine if the token number is valid 4. If the token is on a valid list, a signal light is activated 3 to show the vehicle operator he passed the valid token test. Simultaneously, the data file is retrieved for the corresponding token number to read 9 the biometric template stored. The biometrics sensor is also activated 6 to capture the biometric image. The biometric image is converted to a template 7 and this template is compared to the file template 8. If they match, the biometric sensor or image device calculates the orientation pattern 10. The stored orientation pattern is read 12 and compared to the sensor pattern in question 11 to determine if there is a match. The database can store multiple pattern orientations to have different meanings. A normal patter is stored to reflect a private identification pattern for normal access. A distressed pattern can also be stored to determine when the operator is under duress. If the matching process 11 matches and a distressed pattern is matched 15, the process would flow as normal except a security response would be alerted 16. If the matching process 11 matches and a normal pattern match is determined 14, then the green light or automatic entry lane arrow would be activated 17.

Figure 3:
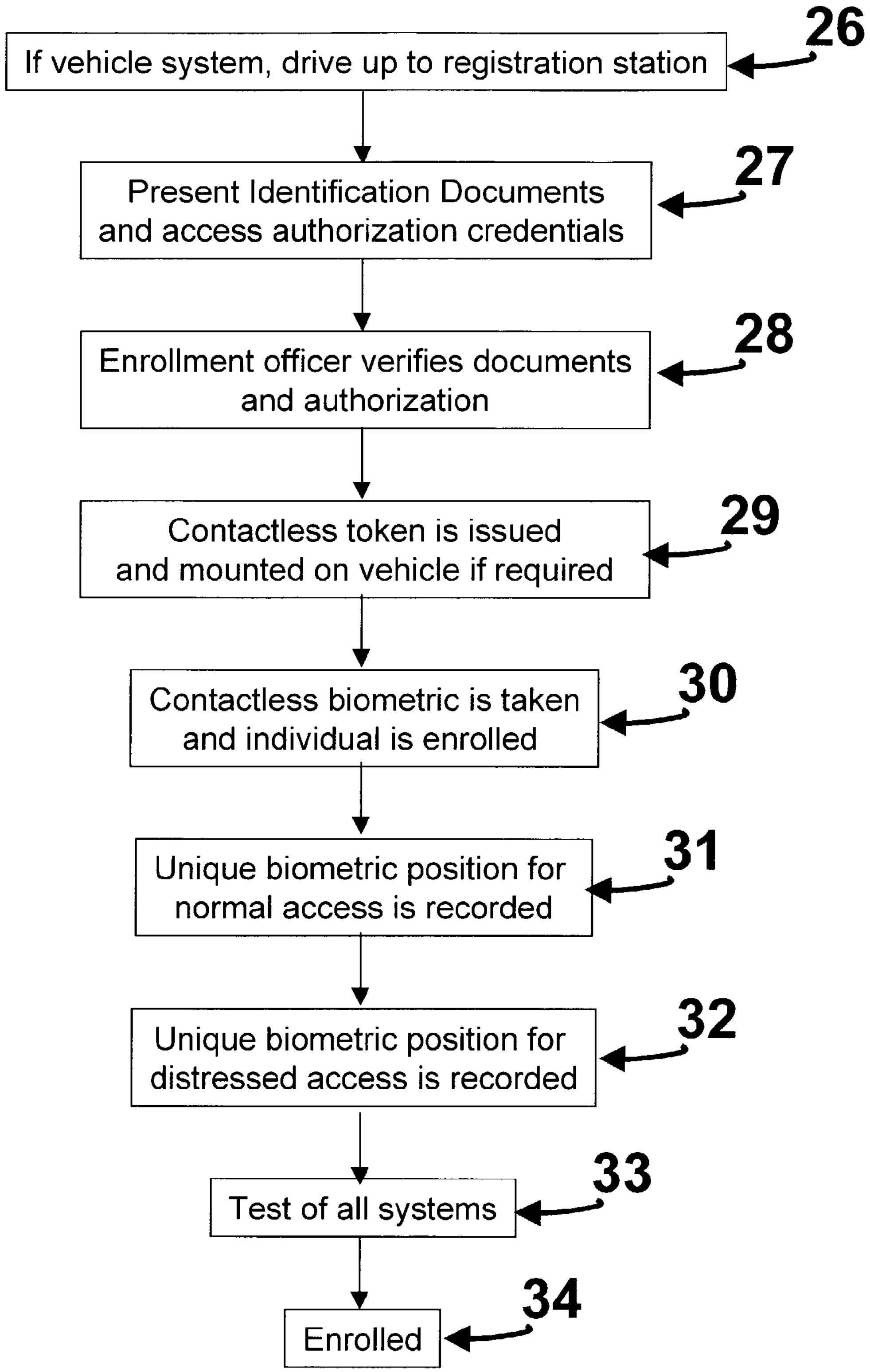
FIG. 3 shows the logic for registering an individual into PAVIS-3.

FIG. 3 depicts the vehicle registration process. The vehicle operator drives up to the registration station 26 and presents his identification documents 27. The enrollment officer verifies the documents and authorization criteria 28. If the officer determines that authorization should be granted, a contactless token is issued and mounted on the vehicle if required 29. A biometric sensor is initiated, the operator's biometric is taken, it is then enrolled 30 into the system, and then linked to the contactless token number. The operator is then asked to provide a personal identification position for normal access of a biometric and this is also added and linked to the file 31. A distressed position can also be added 32. The vehicle and operator are then put through a trial run to ensure the record matches and the sensors work 33. If the test is successful, the individual is enrolled 34. Biometric enrollment data such as face could be checked against a wanted list as a precautionary step if desired.

Figure 4:
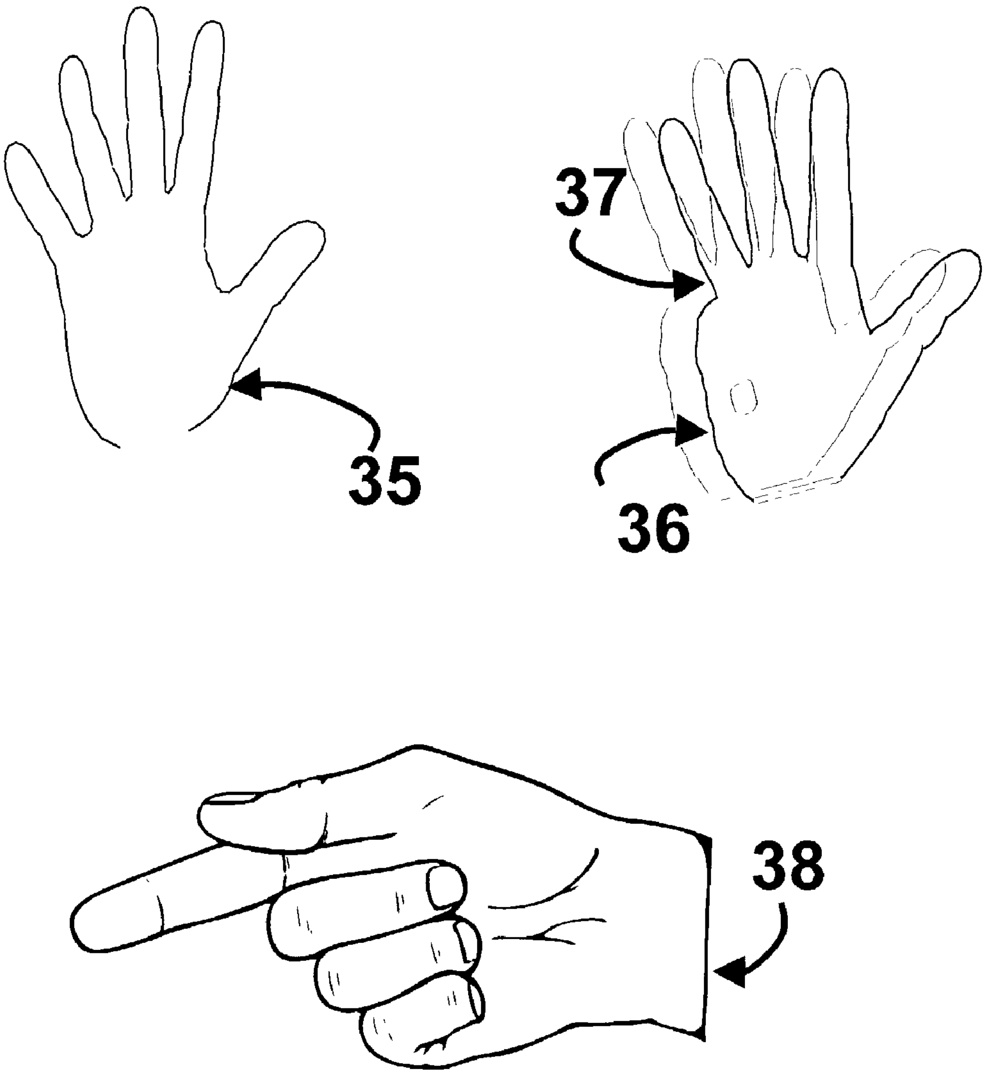
FIG. 4 is an example of positioning a biometrics to a unique pattern.

FIG. 4. shows an example of a hand biometric system that could be read contactlessly. The normal hand position 35 can be used to verify the operator's biometric. The hand in a personal identification position 36 could be a hand with one finger bent forward 36 depicting a unique signature or pattern to the sensor. A distress position such as a finger pointing 38 could be stored to alert security of hostage situations with the goal of gaining entrance.

Alternate embodiments include using facial recognition as the biometric identifier and an alternate face position as the personal identification position. An iris reader could also be used with the option of another body part as the personal identification position.

Access times can also be assigned to security classes of individuals. For example, low-level personnel may not have automatic access privileges for late in the evening access or weekend access. The computer system would recognize this in the verification of token phase and direct the vehicle or person into the visitor lane. A similar approach can be applied to selected buildings, areas, or locations. Contactless sensors can also automatically track and record if a vehicle has left the base or if a person left the building.

Based on sensor configurations, the invention could be used while the vehicle is moving or stationary. Moving would require moving the sensors further apart to accommodate for vehicle speed and sensor/computer processing times.

Entry threat levels could dictate reducing the number of factors of identification from three to two or even one. A two-factor configuration system could use the contactless tag and contactless biometric. A one factor system could allow most vehicles to pass using the contactless token and randomly require the contactless biometric.

An alternative embodiment is not mounting the contactless token on the vehicle rather to provide the operator a card that the operator would present upon entering a facility from the car or on foot. The vehicle process would remain the same just the first step would involve holding the contactless token to present to the sensor. This embodiment would have application if there are more individuals in the car. Each individual would hold up his card and present his biometric and/or personal identification position.

The card approach would allow further access outside the car such as entering building. The central computer could be linked to building where the individual's token could be recognized, verified and allow for reading the contactless biometric and/or personal identification position.

CONCLUSION, RAMIFICATIONS, AND SCOPE

The Personnel And Vehicle Identification System Using Three Factors of Authentication (PAVIS-3) invention is a novel approach to rapidly identify and authenticate vehicles and individuals with a high level of confidence. This invention has the real potential to reduce manpower at base gates, building, and greatly improve system security.

While my above description contains many specificities, these should not be construed as limitations on the scope of the invention, but rather as an exemplification of one of the preferred embodiments. Many other variations are possible; for building, controlled areas, rooms, or information access systems. Any system whose security could be enhanced through contactless token and contact or contactless biometrics would greatly benefit from this three-factor approach. Accordingly, the scope of the invention should be determined not by the embodiments illustrated, but by the appended claims and their legal equivalents.

What I claim as my invention is:

1. An integrated sensor system, comprising:

a token;

a contactless token sensor configured to detect said token while said token is moving;

a contactless biometric sensor configured to detect biometric information while said biometric information is moving and a hand geometry signature position while said hand geometry signature position is moving;

a central computer unit having a template database and matching software implemented thereon, wherein said template database is further comprised of one or more template files having biometric information and a hand geometry signature position associated with specific tokens, and wherein said central computer unit is operatively connected to said contactless token sensor and said contactless biometric sensor; and a vehicle entry station having a vehicle entry lane.

2. The integrated sensor system of claim 1, wherein said token is attached to a vehicle.

3. The integrated sensor system of claim 1, wherein said token is attached to a card.

4. The integrated sensor system of claim 1, wherein said template database is further comprised of one or more template files having a hand geometry signature position indicating distress associated with a specific token.

5. The integrated sensor system of claim 1, wherein said template database is further comprised of one or more template files having access time information associated with a specific token.

6. The integrated sensor system of claim 1, wherein said template database is further comprised of one or more template files having building, area, or location access information associated with a specific token.

7. A method for positive identification of personnel and vehicles, comprising the steps of:

(a) sensing a moving token with a contactless token sensor;

(b) comparing said moving token to a valid token list;

(c) retrieving a template file from a template database implemented on a central computer unit, if said moving token is on said valid token list;

(d) sensing moving biometric information with a contactless biometric sensor;

(e) comparing said moving biometric information to biometric information stored in said template file;

(f) sensing a moving hand geometry signature position with a contactless biometric sensor;

(g) comparing said moving hand geometry signature position to a hand geometry signature position stored in said template file; and (h) signaling that a vehicle having said token can proceed, if said moving biometric information and said moving hand geometry signature position matches said biometric information and said hand geometry signature position stored in said template file.

8. The method of claim 7, further comprising the step of comparing said moving hand geometry signature position to hand geometry signature position indicating distress stored in said template file.

9. The method of claim 8, further comprising the step of alerting a security response if said moving hand geometry signature position matches said hand geometry signature position indicating distress stored in said template file.

10. An integrated sensor system, comprising:

a token;

a contactless token sensor configured to detect said token while said token is moving;

a contactless biometric sensor configured to detect biometric information while said biometric information is moving and a hand geometry signature position while said hand geometry signature position is moving;

a central computer unit having a template database and matching software implemented thereon, wherein said template database is further comprised of one or more template files having biometric information and a hand geometry signature position associated with specific tokens, and wherein said central computer unit is operatively connected to said contactless token sensor and said contactless biometric sensor; and a vehicle entry station having a vehicle entry lane wherein said contactless token sensor and said contactless biometric sensor are located at least two feet from the closest edge of said vehicle entry lane.

11. The integrated sensor system of claim 10, wherein said token is attached to a vehicle.

12. The integrated sensor system of claim 10, wherein said token is attached to a card.

13. The integrated sensor system of claim 10, wherein said template database is further comprised of one or more template files having a hand geometry signature position indicating distress associated with a specific token.

14. The integrated sensor system of claim 10, wherein said template database is further comprised of one or more template files having access time information associated with a specific token.

15. The integrated sensor system of claim 10, wherein said template database is further comprised of one or more template files having building, area, or location access information associated with a specific token.

* * * * *